United States Patent Office

3,410,749
Patented Nov. 12, 1968

3,410,749
ADHESION OF POLYESTER CORDS
TO ELASTOMERS
Chester T. Chmiel, Newfoundland, N.J., assignor to
Uniroyal, Inc., a corporation of New Jersey
No Drawing. Filed Nov. 12, 1964, Ser. No. 410,795
14 Claims. (Cl. 161—92)

ABSTRACT OF THE DISCLOSURE

Adhesion of polyester fiber to rubber is improved by
(a) blending the polyester with poly(vinylpyridine),
(b) spinning the blend,
(c) infusing the fiber with formaldehyde-hydroxybenzoic acid resin or formaldehyde-resorcinol resin,
(d) thereafter adhering the fiber to rubber with a conventional adhesive.
In some cases further improvement is obtainable by infusing the fiber with an acid (e.g., acetic acid) prior to infusing with resin.

---

This invention relates to a method of adhering textile material made from polyesters of the poly(ethylene terephthalate) type to an elastomer, as well as to an improved laminate made by such method. The invention also relates to a novel treatment of material of the poly(ethylene terephthalate) type to render the material more suitable for adhesion to rubber, and the invention is also concerned with the so-treated material.

In one important aspect the invention relates to a new procedure for producing an adhesive bond between an elastomer and tire cords made from polyesters of the poly(ethylene terephthalate) type, heretofore not easily bonded by conventional means. The procedure involves incorporation of a poly(vinylpyridine) into the filaments of the polyester during spinning, then followed by treatment of the mixture in cord form with certain phenolic resins.

Belgian Patent 627,798, January 31, 1963, U.S. Rubber Co. (corresponding to U.S. application Ser. No. 177,720, filed Mar. 6, 1962, abandoned in favor of continuation-in-part application Ser. No. 375,382 filed June 15, 1964 which issued a U.S. Patent 3,361,843 on Jan. 2, 1968), shows that polypropylene fabric, which is incapable of being permanently and deeply colored by acid dyes, can be made to accept acid dyes by incorporating a nitrogen-base polymer, e.g., a poly(vinylpyridine), into the polypropylene during the spinning process, and thereafter activating the fiber by treatment with an acidic reagent capable of diffusing into the polypropylene. Miller et al., U.S. application Ser. No. 352,317, Mar. 16, 1964, describe a method for making linear polyesters dyeable by the same procedure. Miller et al. disclose that the polyesters are condensation polymers of dihydric alcohols with organo-dibasic acids, particularly dicarboxylic acids, and self-condensation polymers of omega-hydroxy carboxylic acids, the preferred materials being poly(ethylene terephthalate), poly(ethylene terephthalate-isophthalate), and poly(1,4-cyclohexylenedimethylene terephthalate). Applicable are all film- and fiber-forming polyesters, in which the ester linkages are intralinear, including poly(alkylene alkanedioates), poly(cycloalkylenedimethylene alkanedioates), poly(alkylene arenedioates), poly(cycloalkylenedimethylene arenedioates), and analogous materials. Examples of the above-named polyesters are respectively, poly(ethylene adipate), poly(1,4-cyclohexylenedimethylene adipate), poly(ethylene terephthalate), and poly(1,4-cyclohexylenedimethylene terephthalate).

It is known to those in the tire industry that Dacron (a trademark for poly(ethylene terephthalate) fiber) which has some properties which make it appear very desirable for use as tire cord, does not adhere very strongly to a compounded styrene-butadiene rubber carcass stock when the cord is solutioned with latices known to promote good adhesion of nylon and rayon cords to the same rubber stock.

It is one object of the instant invention provide methods for enhancing the adhesive bond strength in vulcanized composite structures between cords of linear polyester, e.g., poly(ethylene terephthalate), and compounded styrene-butadiene copolymer rubber stock.

It is a further object to provide methods for enhancing the adhesive bond strength between poly(ethylene terephthalate-isophthalate) copolymer cord and compounded styrene-butadiene rubber carcass stock.

Other objects are to provide an improved laminate of polyester textile material and elastomer material; to provide a treatment for polyesters which renders them capable of improved adhesion to elastomers; and to provide improved polyester-based materials which are useful for adhesion to elastomers.

These objectives are achieved by incorporating a poly(vinylpyridine) into the polyester, prior to imparting the desired shape to the polyester—for example, during the spinning of a yarn from the polyester. The shaped article, such as cord obtained by ply-twisting the yarns, is then exposed to a solution of a phenolic resin heated to at least the glass transition temperature of the polyester (the glass transition temperature of polyethylene terephthalate is usually about 80° C.). Polyester material such as cord treated in this manner, which represents in itself a new and useful article of commerce, is remarkable for its ability to be adhered to elastomers with the aid of conventional tire cord adhesives. Thus, the treated cord may be solutioned with the usual tire cord adhesive composition of resin and rubber latex, and then plied up in alternation with a compounded rubber stock, such as a tire carcass stock, and the composite heated to effect cure of the rubber, thereby producing a laminate that is greatly improved from the standpoint of ply adhesion, in comparison to a similar laminate made with cord composed of polyester that has not been mixed with polyvinylpyridine, and has then been shaped, and treated with phenolic resin as described.

The poly(vinylpyridine) employed in the invention may be a homopolymer or a random, block or graft copolymer. Homopolymers which may be incorporated into the polyester according to the invention include those of 2-vinylpyridine, 3-vinylpyridine, 4-vinylpyridine, 5-methyl-2-vinylpyridine, 2-ethyl-5-vinylpyridine, 2-methyl-5-vinylpyridine, 2-ethyl-6-vinylpyridine, 2-isopropenylpyridine, etc. As is disclosed in the above-mentioned Belgian Patent 627,798 and U.S. application Ser. No. 352,317, the poly(vinylpyridine) may have an intrinsic viscosity in the range from 0.2 to 2.0, measured in pyridine at 30° C. Polymerizable olefinic monomers with which the monovinylpyridine may be copolymerized to give a random or block copolymer include acrylic and methacrylic esters typified by ethyl acrylate and methyl methacrylate, vinyl-arenes typified by styrene, other vinylpyridines, and butadiene-1,3. Alternatively, the monovinylpyridine may be graft-copolymerized, by well-known methods, with a previously formed linear high polymer, typified by polyethylene, polypropylene, polystyrene and polybutadiene. It is always desirable that the basic polymer contain no more than a minor proportion of material copolymerized with the monovinylpyridine, since only the pyridine portion of the polymer additive is active in reacting with an phenolic resin and thereby enhancing the adhesion of the polyester to an elastomer. It will be recognized by those skilled in the art that other basic nitrogen polymers may be used in our invention. Examples of those are polyamides, polyamines, polyurethanes, polyureas, poly(vinylcarbazoles), aniline-formaldehyde resins, etc The amount of poly(vinylpyridine) that is mixed in with the fiber-forming polyester prior to shaping may vary over a wide range, depending on such variables as the particular materials employed and the degree of adhesion desired. In some cases remarkably small quantities of poly(vinylpyridine), e.g. 1% or less based on the weight of the polyester, may be sufficient to produce noticeable improvement (of course, after treatment with phenolic resin as described) but ordinarily it is preferred to use somewhat more than this, say 3–5%. In any event it is not necessary or desirable for optimum results to use more than 10 or 15% of poly(vinylpyridine) and such larger quantities are generally avoided as tending in many cases to degrade the properties of the polyester in certain respects. As is disclosed in the above-mentioned Belgian Patent 627,798 and U.S. application Ser. No. 352,317, incorporation of the poly(vinylpyridine) may be accomplished by mill-blending, tumbling, or any convenient method. The material may be spun into fibers by conventional melt-spinning, which of course involves heating the material above the melting point of the mixture but below its decomposition point.

The phenolic resins which are employed in accordance with the invention to treat the shaped poly(vinylpyridine)-containing polyester include those produced by reacting formaldehyde with 2,4-dihydroxybenzoic acid, 2,3-dihydroxybenzoic acid, 2,5-dihydroxybenzoic acid, 2,6-dihydroxybenzoic acid, 2-hydroxybenzoic acid, 3-hydroxybenzoic acid, 4-hydroxybenzoic acid, 2-chloro-6-hydroxybenzoic acid, resorcinol, phenol, 2,4-dimethylphenol, 2,6-dimethylphenol, 4-methylphenol, 2-methylphenol, 3-methylphenol etc. Although it is not desired to limit the invention to any particular theory of operation, it is thought to be possible that the beneficial effect of the invention may be associated with a tendency for the phenolic resin to react chemically with the polyvinylpyridine in the blend.

The phenolic resin may be applied in any suitable inert solvent in which the resin is soluble to the extent of at least 0.1% concentration by weight. The solvent of course should be one that does not dissolve or swell the polyester. By way of non-limiting example it may be mentioned that water and such organic liquids as hydrocarbons, alcohols, ketones, etc., are suitable solvents.

In all cases, the treatment with phenolic resin is carried out at a temperature at least as high as the glass transition temperature of the polymer.

In the case of some polyesters, particularly the more crystalline polyesters, such as poly(ethylene terephthalate), it is found that best results are obtained when the cord of blended polymers is treated with acidic chemical reagents, before treatment with the phenolic resin. Examples of the acidic chemical reagents used for this purpose are the following:

(1) Mineral acids, such as hydrochloric acid, hydrobromic acid, sulfurous acid, nitric acid, sulfuric acid, phosphoric acid and perchloric acid. The last three acids, which are highly ionic materials, require higher application temperatures to assist their diffusion into the polymer blend.

(2) The anhydrous acid gases corresponding to the mineral acids defined above, whether the undissociated acid or the acid anhydride, illustrated by hydrogen chloride, hydrogen bromide, sulfur dioxide, and nitrogen dioxide. A source of hydrogen ions such as water in or on the polyester-poly(vinylpyridine) blend power is essential in those cases where none is present in the reagent.

(3) Organo-carboxylic acids, including aliphatic and aromatic acids, mono-carboxylic and dicarboxylic acids, saturated and unsaturated acids. Suitable acids are exemplified by formic, acetic, propionic, stearic, and other alkanoic acids in the $C_{1-18}$ range; undecylenic, oleic, benzoic, salicyclic, succinic, adipic, phthalic, bromoacetic, chloroacetic and lactic acids. The organic acid may be used in its liquid or molten state (when its melting point is below the temperature selected for the fiber treatment), or in solution in a volatile organic solvent such as benzene or toluene. It may be used in water solution—provided that the solubility of the acid in water is sufficient to provide a solution containing at least 20% (by weight) of the acid solute, the acid being used at no less than 20% concentration. Greater dilution with water greatly reduces diffusion of the organic acid into polyester-poly(vinylpyridine) blend and results in reduced adhesion.

(4) Those halide compounds which liberate hydrohalic acid on contact with water at the temperature of the treatment. Examples of such compounds are:

(a) Halides of non-metallic elements such as phosphorous and sulfur (exemplified by $PCl_3$, $POCl_3$, $SCl_2$, $S_2Cl_2$, $SOCl_2$, $SO_2Cl_2$).

(b) Metal halides such as the halides of zinc, tin and aluminum.

(c) Acid halides of organic acids of the class defined in section 3, and organosulfonyl halides, typified by acetyl, benzoyl, adipyl, and p-toluene-sulfonyl chlorides.

(d) Activated alkyl halides containing a conjugated grouping which enhances the reactivity of the halogen atom; e.g., allylic and benzylic halides (such as chlorides).

(5) Other compounds capable of forming complexes or addition compounds with basic nitrogen polymers, e.g., boron trifluoride, n-butyl borate, and phenol.

Such treatment with an acidic reagent is similarly carried out at a temperature at least as elevated as the glass transition temperature. It will be understood that the acidic reagent diffuses or infuses into the fiber under the conditions of the treatment. It will be understood that the treatment with acidic reagent is in any case followed by treatment with phenolic resin, as described.

In practice there is a tendency for the crystallinity of the polyester to vary from one lot to another, and therefore in most cases the preferred procedure for enhancing adhesion of polyester cord, whether homopolymer or copolymer, to rubber is to successively treat the cord [containing poly(vinylpyridine)] with an acidic reagent and a solution of phenolic resin.

The cord or fabric of blended polyester and poly(vinylpyridine), treated as described, may be adhered to elastomers with the aid of conventional adhesive compositions. In the case of tire cord, an adhesive particularly suitable for this purpose is the so-called tire cord solution, actually a rubber latex containing resorcinol-formaldehyde resin. Such solution may be based on natural rubber latex or a synthetic rubber latex, such as SBR latex. Frequently the solution contains a latex of a copolymer containing vinylpyridine, such as a styrene-butadiene-vinylpyridine copolymer, in place of or in addition to the just-mentioned rubber latices. The proportions of rubber and resorcinol-formaldehyde resin in such aqueous adhesive composition may be in accordance with conventional practice. The adhesive is conveniently applied by dipping the cord in the adhesive solution, and thereafter drying.

The dried cord is thereafter contacted with the vulcanizable elastomer composition to which it is desired to adhere the cord. The elastomer composition may be a conventional tire carcass stock, or any other suitable rubber stock, such as a belt stock, appropriate to the particular final article being produced. The stock may be based on any conventional elastomer such as natural rubber, polybutadiene, polyisoprene, diene copolymers such as SBR, nitrile rubber, butyl rubber, ethylene-propylene-diene [e.g. dicyclopentadiene, 1,4-hexadiene, 1,5-cyclooctadiene, methylenenorbornylene, etc.], and the like, compounded for vulcanization in the conventional manner. Vulcanization of the elastomer in contact with the polyester textile treated as described produces a remarkably strong adhesive bond.

The following examples illustrate the invention in more detail.

Example 1

This example illustrates the level of adhesion obtained between rubber and poly(ethylene terephthalate-isophthalate) cords with and without poly(vinylpyridine) when the cords are subjected to a solution treatment with 2,4-dihydroxybenzoic acid-formaldehyde resin and then solutioned with a resin and rubber latex composition.

Cords shown in Table 1 are heated for 1 hour under reflux (80° C.) in a methyl ethyl ketone solution of 2,4-dihydroxybenzoic acid-formaldehyde resin prepared as follows: One gram of 2,4-dihydroxybenzoic acid is melted in an aluminum pan, and there is added to the melt sufficient paraformaldehyde to provide one mole of formaldehyde for each mole of acid. A reddish brown color develops immediately and the mixture begins to resinify. Before complete resinification occurs the mixture is cooled to room temperature. The solid is extracted with methyl ethyl ketone and then diluted to produce a 0.2% solution (by weight.) After the cords are washed with pure methyl ethyl ketone and dried, they may be solutioned with a resin-and-rubber latex (such as for example the solution described on p. 814 of "Materials Research & Standards, ASTM," October 1962, or equivalent, such as those described in U.S. Patent 3,018,207, Danielson, Jan. 23, 1962, col. 3, lines 35–44) and dried 1 minute at 200° C. (Such an adhesive comprises butadiene-vinylpyridine polymer latex containing resorcinol-formaldehyde resin). The dried cords are then plied up with a conventionally compounded rubber stock and cured at 177° C. for 20 minutes under pressure.

The stock may be, for example, the stock described in 3,018,207 at col. 3, lines 8–18 (or, less preferably, the stock described at col. 3, lines 19–21). Provisions are made, in preparing the samples for curing, to allow for stripping of the cord from the rubber after curing. Single-end cord-stripping pull values may be obtained in an Instron Tester at room temperature and at an angle of 180° to the direction of the cords in the cord-rubber interface. Dacron cord is studied also for comparison purposes.

TABLE 1

| Cord: | Pulls, lbs. |
|---|---|
| Dacron | 0.5 |
| Poly(ethylene terephthalate-isophthalate) copolymer without poly(vinylpyridine) | 1.0 |
| Poly(ethylene terephthalate-isophthalate) copolymer with 3% 2-vinylpyridine polymer having a softening point of 90° C. | 2.0 |

Table I shows that the polyester copolymer cord containing poly(vinylpyridine) produces an adhesive bond to rubber which is twice as strong as that of the cord which does not contain poly(vinylpyridine).

Example 2

This example illustrates the level of adhesion obtained between rubber and poly(ethylene terephthalateisophthalate) cords with and without the poly(vinylpyridine) used in Example 1 when the cords are subjected to a solution treatment with the resorcinol-formaldehyde resin and then solutioned with a resin latex.

Cords shown in Table 2 were heated for 1 hour under reflux (80° C.) in a 0.2% (by weight) solution of resorcinol-formaldehyde resin (Koppers Penacolite Resin B–1–A) in methyl ethyl ketone. After the cords were washed with pure methyl ethyl ketone and dried, they were solutioned with a resin-and-latex composition, as in Example 1, and dried 1 minute at 200° C. The dried cords were cured and tested as in Example 1.

Table 2

| Cord: | Pull, lbs. |
|---|---|
| Poly(ethylene terephalate-isophthalate) copolymer without poly(vinylpyridine) | 2.5 |
| poly(ethylene terephthalate-isophthalate) copolymer with 3% poly(vinylpyridine) | 4.5 |

Table 2 shows that the adhesive bond strength between rubber and poly(ethylene terephthalate-isophthalate) cords is appreciably greater when poly(vinylpyridine) is incorporated into the polyester.

Example 3

This example illustrates the level of adhesion obtained between rubber and poly(ethylene terephthalate-isophthalate) cords with and without the poly(vinylpyridine), when the cords are treated first with glacial acetic acid before being subjected to a solution treatment with 2,4-dihydroxybenzoic acid-formaldehyde resin.

Cords shown in Table 3 were treated in glacial acetic acid at 85° C. for 5 minutes. After washing and drying, the cords were heated for 1 hour under reflux (80° C.) in a methyl ethyl ketone solution of 2,4-dihydroxybenzonic acid-formaldehyde resin (0.2%, by weight, of the solution). The cords were washed with pure methyl ethyl ketone and dried. They were then solutioned with the the resorcinol-formaldehyde latex, and dried 1 minute at 200° C. The dried cords were cured against rubber and tested as in Example 1.

Table 3

| Cord: | Pull, lbs. |
|---|---|
| Dacron | 0.5 |
| Poly(ethylene terephthalate-isophthalate) copolymer without poly(vinylpyridine) | 0.5 |
| Poly(ethylene terephthalate-isophthalate) copolymer with 3% poly(vinylpyridine) | 2.0 |

Table 3 shows that the polyester copolymer cord containing poly(vinylpyridine) produces an adhesive bond to rubber which is four times stronger than that of the cord which does not contain poly(vinylpyridine). Comparison with Table 1 shows that the glacial acetic acid treatment does not produce any further enhancement of the bond strength between rubber and cord containing poly(vinylpyridine). The crystallinity of the polyester copolymer cord is low enough that the acid treatment is not needed.

Example 4

This example illustrates the level of adhesion obtained between rubber and poly(ethylene terephthalate) cords with and without the poly(vinylpyridine), when the cords are treated first with glacial acetic acid before being subjected to a solution treatment with 2,4-disydroxybenzoic acid-formaldehyde resin.

Cords shown in Table 4 were refluxed in glacial acetic acid (118° C.) for 1 hour. After being washed with water and dried, the cords were refluxed at 80° C. for 1 hour in the methyl ethyl ketone solution of 2,4-dihydroxybenzoic acid-formaldehyde resin (0.2%, by weight, of the solution). After being washed with pure methyl ethyl ketone and dried, the cords were solutioned with the resorcinol-formaldehyde latex and dried for 1 minute at 200° C. The dried cords were cured and tested as in Example 1. Dacron cord was treated similarly for comparison purposes.

Table 4

| Cord: | Pull, lbs. |
|---|---|
| Dacron | 0.6 |
| Poly(ethylene terephthalate) without poly(vinylpyridine) | 0.5 |
| Poly(ethylene terephthalate) with 4% poly(vinylpyridine) | 1.0 |

Table 4 shows that the polyester cord containing poly(vinylpyridine) produced an adhesive bond to rubber which is twice as strong as that of the cord which does not contain poly(vinylpyridine). If the treatment with glacial acetic acid is omitted or carried out at only 80° C., the pull value is reduced, as compared to the value for the preferred method.

Having thus described my invention, what I claim and desire to protect by Letters Patent is:

1. A method of improving the adhesion characteristics of shaped articles made from fiber-forming polyesters to rubber comprising mixing the polyester with poly(vinylpyridine) homopolymer having an intrinsic viscosity in the range from 0.2 to 2.0 measured in pyridine at 30° C., shaping it by spinning, and reacting the shape with a phenolic resin produced by reacting formaldehyde with an acid selected from the group consisting of hydroxybenzoic acids and phenols.

2. A method of improving the adhesion to rubber of fiber made from a polyester selected from the group consisting of poly(ethylene terephthalate) and poly(ethylene terephthalate-isophthalate) copolymer comprising mixing the polyester with poly-vinylpyridine) homopolymer having an intrinsic viscosity in the range from 0.2 to 2.0, measured in pyridine at 30° C., spinning it into a fiber, and thereafter reacting the fiber with a phenolic resin produced by reacting formaldehyde with an acid selected from the group consisting of hydroxybenzoic acids and resorcinol.

3. A method as in claim 2 in which the fiber is infused, prior to reaction with said phenolic resin, with an acidic chemical reagent.

4. The product of the method of claim 1.
5. The product of the method of claim 2.
6. The product of the method of claim 3.

7. A method of adhering fiber-forming polyester selected from the group consisting of poly(ethylene terephthalate) and poly(ethylene terephthalate-isophthalate) copolymer to rubber comprising melt-blending the polyester with poly(vinylpyridine) homopolymer having an intrinsic viscosity in the range from 0.2 to 2.0, measured in pyridine at 30° C., spinning the blend to form a fiber, thereafter coating the fiber with a phenolic resin selected from hydroxybenzoic acid-formaldehyde resin and resorcinol-formaldehyde resin, at a temperature at least as elevated as the glass transition temperature of the polyester, subsequently applying an adhesive comprising butadiene-vinylpyridine copolymer latex containing resorcinol-formaldehyde resin to the thus-treated fiber, and then laminating to vulcanizable rubber stock and vulcanizing the laminate.

8. A method as in claim 7 in which the said fiber is infused with an acidic chemical reagent at a temperature at least as high as the glass transition temperature of the polyester, prior to coating with said phenolic resin.

9. A method as in claim 7 in which the phenolic resin is a hydroxybenzoic acid-formaldehyde resin.

10. A method as in claim 7 in which the phenolic resin is a resorcinol-formaldehyde resin.

11. A laminate of a vulcanized rubber stock and a fiber, said fiber being a melt-blend of a polyester, selected from the group consisting of poly(ethylene terephthalate) and poly(ethylene terephthalate-isophthalate) copolymer, with poly(vinylpyridine) homopolymer having an intrinsic viscosity in the range from 0.2 to 2.0, measured in pyridine at 30° C., coated at a temperature at least as elevated as the glass transition temperature of the polyester with a solution of a phenolic resin selected from hydroxybenzoic acid-formaldehyde resin and resorcinol-formaldehyde resin after spinning of the fiber.

12. A laminate as in claim 11 in which the spun fiber, before coating with said phenolic resin, is infused with an acidic chemical reagent at a temperature at least as elevated as the glass transition temperature of the polyester.

13. A method of improving the ability to adhere to rubber of fiber made from a substantially crystalline poly(ethylene terephthalate) homopolymer polyester comprising melt-blending the polyester with poly(vinylpyridine) homopolymer having an intrinsic viscosity in the range from 0.2 to 2.0, measured in pyridine at 30° C., spinning the blend into a fiber, thereafter infusing the fiber with an acidic chemical reagent at a temperature at least as elevated as the glass transition temperature of the polyester, and subsequently coating the fiber with a resin selected from the group consisting of hydroxybenzoic acid-formaldehyde resin and resorcinol-formaldehyde resin at a temperature at least as elevated as the glass transition temperature of the polyester.

14. A method of improving the ability to adhere to rubber of fiber made from a substantially amorphous poly(ethylene terephthalate-isophthalate) copolymer polyester, comprising melt-blending the polyester with poly(vinylpyridine) homopolymer having an intrinsic viscosity in the range from 0.2 to 2.0 measured in pyridine 30° C., spinning the blend into a fiber, and subsequently coating the fiber with a resin selected from the group consisting of hydroxybenzoic acid-formaldehyde resin and recorcinol-formaldehyde resin at a temperature at least as elevated as the glass transition temperature of the polyester.

References Cited

UNITED STATES PATENTS

| | | |
|---|---|---|
| 2,497,454 | 2/1950 | Illingworth. |
| 2,766,164 | 10/1956 | Salem _____ 161—190 X |
| 2,882,255 | 4/1959 | Caldwell et al. _____ 260—873 |
| 2,898,315 | 8/1959 | Smith et al. _____ 260—873 |
| 2,990,313 | 6/1961 | Knowles et al. |
| 3,051,594 | 8/1962 | Aitken. |
| 3,231,412 | 1/1966 | Pruitt et al. _____ 117—76 |

EARL M. BERGERT, *Primary Examiner.*

CLIFTON B. COSBY, *Assistant Examiner.*